(12) United States Patent
Wu et al.

(10) Patent No.: US 9,674,505 B2
(45) Date of Patent: Jun. 6, 2017

(54) DISPARITY SEARCH RANGE DETERMINATION FOR IMAGES FROM AN IMAGE SENSOR ARRAY

(71) Applicant: INTEL CORPORATION, Santa Clara, CA (US)

(72) Inventors: Yi Wu, San Jose, CA (US); Jiang Yong, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 171 days.

(21) Appl. No.: 14/565,149

(22) Filed: Dec. 9, 2014

(65) Prior Publication Data

US 2016/0165216 A1 Jun. 9, 2016

(51) Int. Cl.

| | | |
|---|---|---|
| G06K 9/00 | (2006.01) |
| H04N 13/02 | (2006.01) |
| H04N 5/225 | (2006.01) |
| H04N 5/357 | (2011.01) |
| H04N 13/00 | (2006.01) |
| H04N 5/369 | (2011.01) |
| G06T 7/00 | (2017.01) |
| H04N 101/00 | (2006.01) |
| H04N 5/247 | (2006.01) |

(52) U.S. Cl.
CPC .......... *H04N 13/0271* (2013.01); *G06T 7/97* (2017.01); *H04N 5/2258* (2013.01); *H04N 5/3572* (2013.01); *H04N 5/3696* (2013.01); *H04N 13/0018* (2013.01); *H04N 13/0037* (2013.01); *H04N 13/0257* (2013.01); *H04N 13/0282* (2013.01); *H04N 5/247* (2013.01); *H04N 2013/0077* (2013.01); *H04N 2013/0081* (2013.01); *H04N 2013/0092* (2013.01); *H04N 2101/00* (2013.01)

(58) Field of Classification Search
USPC .......................................... 382/154
See application file for complete search history.

(56) References Cited

U.S. PATENT DOCUMENTS

| | | | | |
|---|---|---|---|---|
| 5,432,712 A | * | 7/1995 | Chan | G01C 11/06 |
| | | | | 348/E13.014 |
| 2011/0158528 A1 | * | 6/2011 | Yea | G06T 7/0075 |
| | | | | 382/170 |
| 2014/0063188 A1 | * | 3/2014 | Smirnov | H04N 13/0018 |
| | | | | 348/43 |

* cited by examiner

*Primary Examiner* — Andrew Moyer
(74) *Attorney, Agent, or Firm* — Blakely, Sokoloff, Taylor & Zafman LLP

(57) ABSTRACT

A range is determined for a disparity search for images from an image sensor array. In one example, a method includes receiving a reference image and a second image of a scene from multiple cameras of a camera array, detecting feature points of the reference image, matching points of the detected features to points of the second image, determining a maximum disparity between the reference image and the second image, and determining disparities between the reference image and the second image by comparing points of the reference image to points of the second image wherein the points of the second image are limited to points within the maximum disparity.

21 Claims, 9 Drawing Sheets

GENERIC STEREO DISPARITY FLOW CHART

DISPARITY SEARCH RANGE DETERMINATION FOR IMAGES FROM AN IMAGE SENSOR ARRAY

FIELD

The present description relates to determining a search range for determining disparity between images from an array of image sensors.

BACKGROUND

Small digital cameras have become commonplace on portable telephone, communication, entertainment, and media devices. There is a corresponding increase in the use of cameras for security, navigation, safety, and other uses. Two cameras directed at the same scene from different positions provide stereo vision allowing for depth perception. The accuracy of the depth perception can be improved using more than two different cameras. An array of cameras or image sensors mounted to a single device can also enable many other compelling 3D user experiences, including temporal resolution and increased dynamic range. A variety of different portable photographic, computing, and media player devices can be adapted to integrate camera array technology on their platforms.

Image disparity refers to the difference in the visual direction of two or more points in space. The shift in the position of a pixel in one image (a reference image) with respect to another other image is known as the disparity. A disparity determination calculates the correct shift per pixel by trying a range of possible shift values, e.g., d=[0, ..., maxD] through an image matching process.

Pixel correspondences and disparity are used in a variety of 3D computer vision applications, e.g., 3D depth reconstruction, 3D object segmentation, 3D object detection and tracking, view interpolation, super-resolution, etc.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Searches for image disparity determinations typically use a parameter "maxD" to define the upper bound for the search. This upper bound limits the number of possible disparity values that are compared in the search. Without any bound each pixel in the reference image would be compared to every pixel in the secondary image. In practice only pixels that are likely to correspond to the correct disparity need to be included in the search.

The correct disparity is directly related to the distance from objects in the actual scene to the image sensor of each camera. In actual scenes objects can be located at many different distances from the camera, so that the real "maxD" varies for each image and depends on the particular scene that is captured as well as the distance of objects in that scene from the camera.

If the maximum allowed disparity value, maxD, is predetermined then the disparity value may be incorrect or the search may take more time than necessary. Using a predetermined maxD arbitrarily limits the depth range that could be recovered from a set of images. For example, if maxD is set to be too small, pixels for objects that are closer to the camera and therefore correspond to a correct disparity value larger than maxD, will be assigned a lower incorrect disparity value because the value is limited to maxD.

A predetermined maxD may alternatively increase runtime. The disparity search will normally search all possible pixel shift values from zero to the upper bound, d=[0, ..., maxD], to find the correct disparity. The runtime of the disparity calculation increases as maxD increases. If maxD is set much higher than the real disparity range, then many disparity values will be searched that will not be the correct result. A predetermined maxD also may introduce more errors in the disparity determination. With a larger range of possible shift values to match, the possibility of selecting the wrong match from the search also increases.

A better and more efficient disparity determination may be done by determining an appropriate maxD value for each set of images. This may be done quickly, as described below, by analyzing the image content of the set of images received from the image array. Each image capture from the array may have a maxD value that is specifically chosen for that capture. As a result, the full range of disparity values for the capture may be analyzed without unnecessary searching. This also reduces the risk of selecting an incorrect disparity value from the search by eliminating many possible incorrect values.

Figure 1:
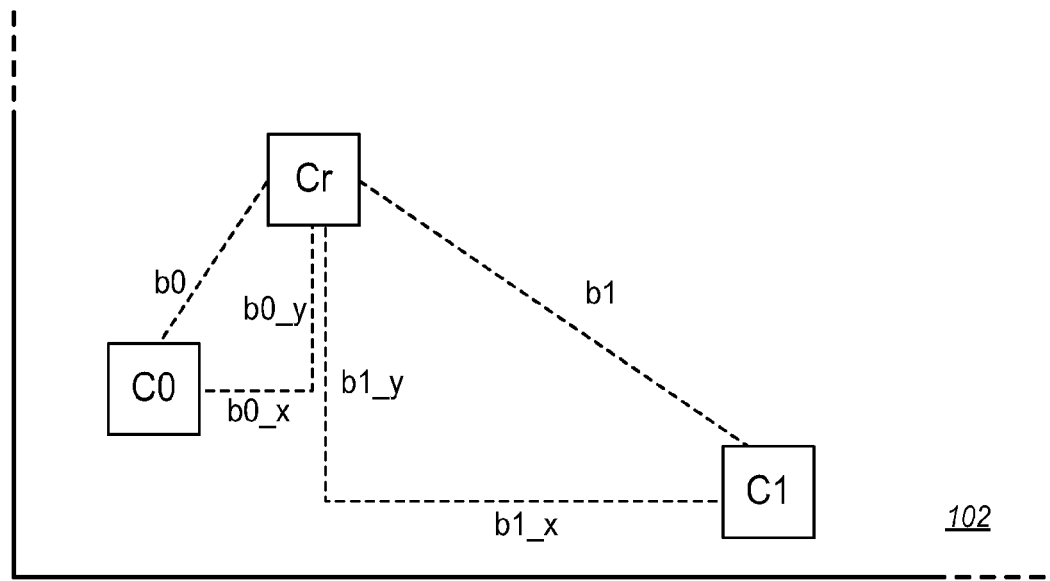
FIG. 1 is a diagram of a layout of three image sensors on a device according to an embodiment.

FIG. 1 is a diagram of a layout of three cameras on a single surface of a device 102. The device has an exterior housing shown as the surface of FIG. 1. The cameras are mounted in a typically fixed position on the surface. The cameras may be near a display, such as a touchscreen display, microphones, speakers and other components on the device. The cameras may be oriented on a front side or a back side of the device and may be oriented toward a user or away from the user. There may a camera on one or more surfaces of the device.

A reference camera Cr is used as the reference point for the position of the other two cameras C0, C1. There may be more or fewer other cameras. The second camera C0 is a specific distance b0 from the reference camera Cr. This distance may be in any direction from the position of the reference camera and has a vertical component b0_y and a horizontal component b0_x. Similarly, the third camera C1 is a distance b1 from the reference camera. This distance is illustrated as but is not necessarily in a different direction from the reference camera as compared to the second camera. This distance also has a vertical component b1_y and a horizontal component b1_x. Any number of additional cameras may be identified with reference to the position of the reference camera. As shown, the distances b0, b1 are not necessarily equal and the vertical and horizontal components of these distances are also not necessarily equal. Accordingly, the camera array is asymmetrical. In a symmetrical array, the distances may be the same in both the horizontal and the vertical. In many cases, the cameras are aligned so that either the horizontal (b0_x, b1_x) or the vertical (b0_y, b1_y) components are zero. As described herein, disparity may be determined between any number of cameras in symmetrical or asymmetrical arrays.

To determine a maximum disparity for a set of images from a camera array, first a single image pair is selected. The set of images typically corresponds to one image of the same scene captured at about the same time from each of the sensors. In some cases, the sensor array may operate in different modes in which less than all of the sensors are used. Only two images are required to determine disparity, however, three, four, or more may be used. The images are ideally captured at exactly the same time to ensure that the scene has not changed between captures. Typically, it may be assumed for purposes of determining disparity that the images from each camera are perfectly synchronized. However, with real systems, there may be some timing difference between sensors. This may be a small difference caused by hardware difference, a larger difference so that hardware resources may be used in series by the different sensors, or it may be a still larger difference for any of a number of different reasons. The set of images may still be used provided that the change in the scene is not too great.

For determining the disparity range when there are multiple images of a scene per capture, only a single image pair is required. The first image is the reference image Ir from the reference camera Cr or image sensor. The second image is from the camera located farthest from the reference camera. The farthest camera will have the greatest disparity values in its images. In the example of FIG. 1, the distance b1 is longer than the distance b0, so camera C1 is farther from camera Cr than camera C0. The secondary image of the pair is therefore I1 from camera C1. If the secondary cameras are equidistant from the reference camera, then any one of the secondary camera images may be used.

Figure 2A:
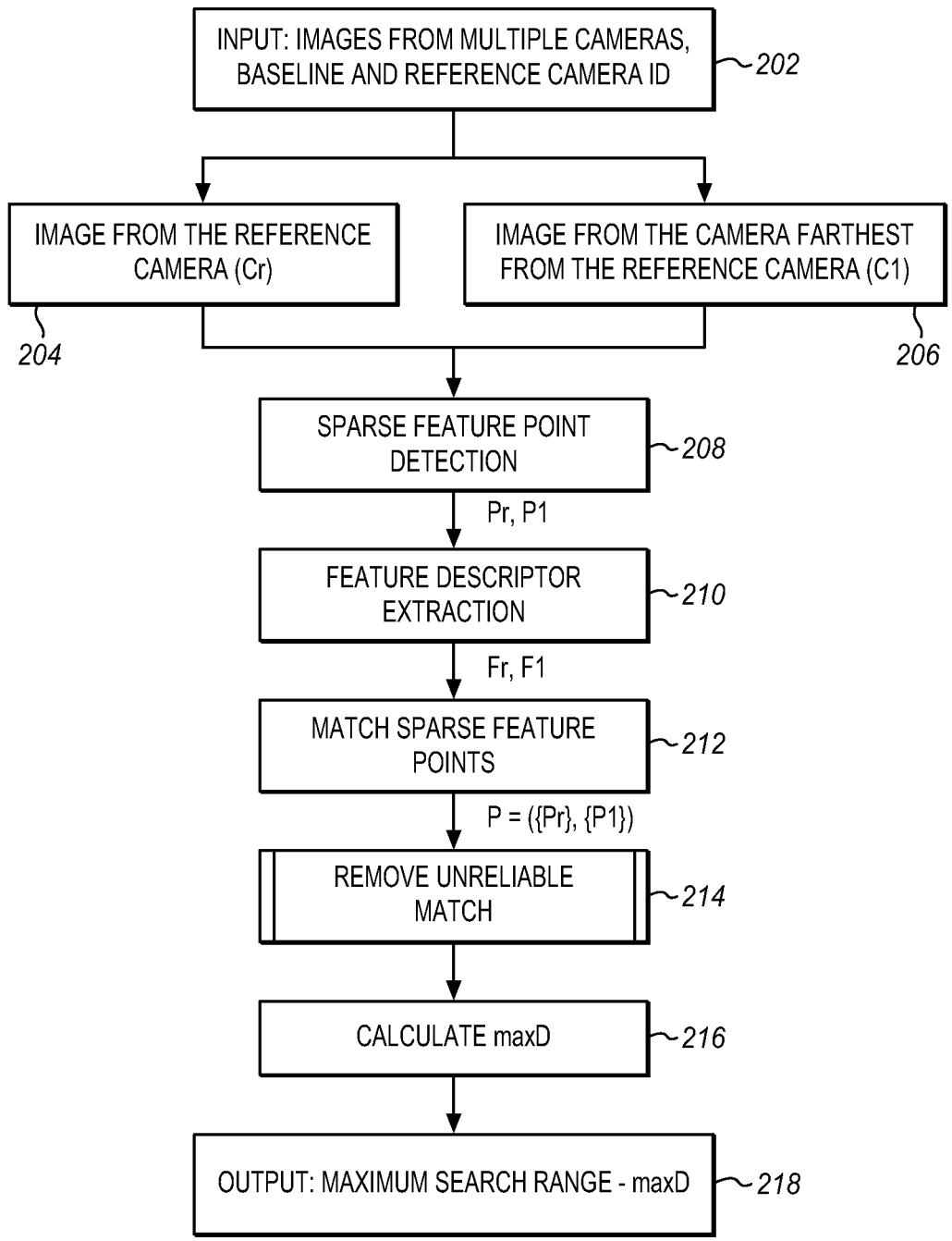
FIG. 2A is a process flow diagram of determining a maximum disparity for two images according to an embodiment.

FIG. 2A is a process flow diagram of determining a maximum disparity value for a single pair of images. The image data 202 is received from the camera array. This information may include the images identified by camera, the baseline, and more. The images of interest for the maximum disparity calculation, as mentioned above is the reference camera image Ir 204 and the image I1 206 from the farthest secondary camera.

The two images, Ir and I1, are analyzed at 208 to detect feature points. A feature point may be understood as relating to a visually salient part of an image with high information content, such as corners. In addition to high information content a feature point may have repeatability. Repeatability refers to a feature that will be detected in two or more different images of the same scene. For purposes of this analysis only a few feature points are required. More features may be detected and used later in the disparity determinations. In some embodiments sparse feature detectors or sparse keypoint detectors may be used such as Difference of Gaussian, fast corner detector, etc. The features may be RGB features, census features, grayscale features or other types of features. These techniques produce two sets of feature points referred to herein as Pr for the reference image and P1 for the secondary image.

After at least some keypoints or feature points (Pr, P1) are detected at 208 from both images, feature descriptors, Fr, F1 are extracted at 210 from each feature point. Any of a variety of different feature descriptors may be used such as float vectors, binary vectors, etc., depending on the particular implementation. Common feature descriptors include BRIEF (Binary Robust Independent Elemental Features), SURF (Speeded Up Robust Features), FREAK (Fast Retina Keypoint), ORB (Oriented Fast and Rotated BRIEF), etc. The particular features are chosen only to match corresponding pixels of the two images. Accordingly, the feature descriptor does not require rich information but only a reliable match.

At 212, the feature descriptors from the two images, represented as (Fr and F1), are matched against each other to find a set of matching feature points P=({Pr}, {P1}) using L1, L2, Hamming distances, etc. At 214, after an initial set of matching feature points P is found, matching outliers may optionally be removed. There are a variety of different techniques for determining which matches are outliers and any one or more of these may be used. The outliers will yield incorrect disparities that do not correspond to any actual disparity between the two images. Removing outliers is an optional operation. If the outliers are used for determining maxD the result may still be better than an arbitrary or estimated predetermined value. Removing the outliers yields a more accurate final result for maxD without any loss of fidelity.

Figure 2B:
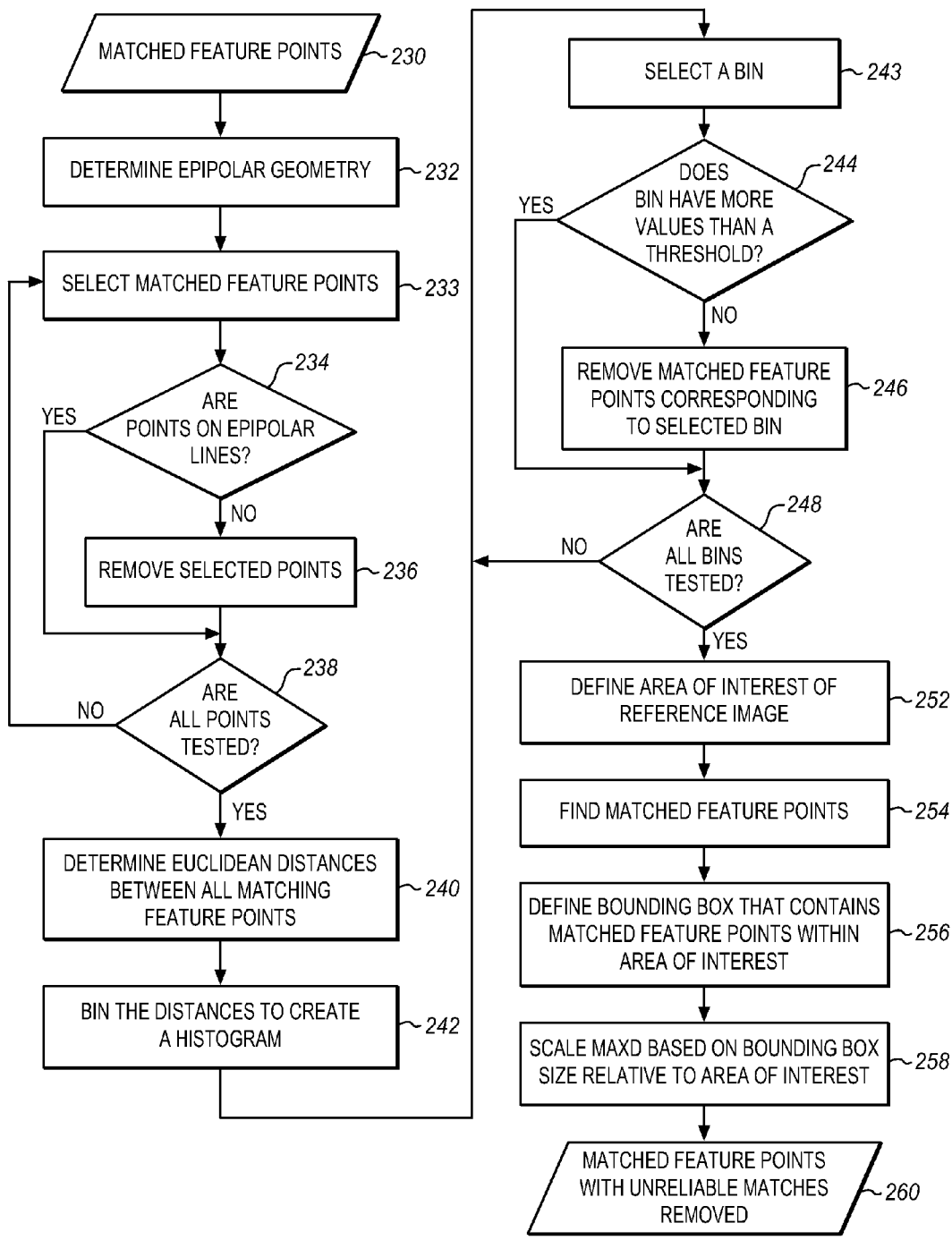
FIG. 2B is a process flow diagram of removing unreliable matches in the process flow of FIG. 2A according to an embodiment.

FIG. 2B is a process flow diagram showing an expansion of operations that may optionally be used for removing unreliable matched feature points 214 or outliers. This diagram includes three approaches, however, any one or more may be used or different approaches may be combined with these or replace these approaches. The input 230 to all of these processes is the set of matched feature points determined in FIG. 2A at 212. One approach to removing outliers is to apply an epipolar geometry constraint. If the images are already rectified with respect to each other, then the epipolar geometry of the images is known. If the images are not rectified, then the fundamental matrix may be calculated using robust estimates such as a Ransac estimate. The fundamental matrix may then be used to establish the epipolar geometry at 232. With the geometry established at 232 each pair of matching feature points should be positioned on corresponding epipolar lines.

A matched pair of feature points is selected at 233. The selected matched pair is then compared to evaluate the positions of the pixels against the epipolar geometry at 234. If the points of the selected pair do not lie on the corresponding epipolar lines, then the matching points do not actually match and therefore may be removed at 236. This process is repeated at 238 for all of the matching feature points.

A second approach is to apply a distance histogram constraint. This may be done by first determining the Euclidean distance between the two points of each of the matching pairs of feature points at 240. The distances may then be binned at 242 to create a histogram of the distribution of these Euclidean distances. A bin is then selected at 243 and the number of distances is compared to a threshold at 244. The feature point pairs with distances in a histogram bin which contains very few values may be considered as outliers and the corresponding matching pairs may be removed at 246. This comparison is repeated for all of the bins at 248 so the feature points in all of bins with very few results will be removed.

As an example a threshold of 100 may be set so that any bin containing less than e.g. 100 pairs for the distance range corresponding to that bin may be removed. All of the pairs in that bin are ignored. The value of the threshold may be adapted to suit the particular image sensors, the distance range for each bin and the depth accuracy desired. In an actual scene, real objects at a particular depth will have many pixels, if there are only very few pixels in the image to describe an object, then the corresponding features will also have very few feature points. This features then is either not important or it does not correspond to an actual object. The feature may be noise or some other artifact.

Of course, the histogram is a construct for selecting a set of distance ranges and then determining the number of actual distances that fall within each range of the set. The matched pairs for which there are less than a threshold number of pairs within any one distance range of the set of ranges may be removed. The function of the histogram may be performed in a many different ways depending on the particular implementation.

A third approach is to use an area of interest compensation. If the image contains for example a large low-texture foreground area close to the camera such as the ground, a white tablecloth, etc., there will be few if any sparse feature keypoints in those areas. Therefore, the detected sparse feature keypoints are likely limited to a small area of the image farther away from the camera. The far distance objects will yield smaller disparity values than foreground objects would so the upper bound (maxD) for the disparity will be smaller.

In this approach the maximum disparity maxD is compensated by scaling according to the size of the area that covers the surviving features. An area of interest may be defined at 252, for example, by a block at the center of the reference image. This block may cover ½, ⅔, ¾ or some other portion of the pixels and centered or positioned in some other way in the reference image. The aspect ratio of the block may be adapted to suit any particular implementation and camera type. Next, all of the matched feature points within this area of interest are located at 254. A bounding box may then be defined at 256 which contains all of the matched feature points that are within the area of interest. The bounding box may be the same size as the area of interest but is usually smaller.

maxD is therefore scaled using the bounding box size. The size of the area of interest ($S_{aoi}$) may be expressed as a fraction of the total image size. This size of the bounding box $S_{features}$ may also be expressed as a fraction of the total image size. The bounding box will always be either the same size or smaller than the size of the area of interest. These two fractions may then be used to scale the maximum disparity value at 258. In one example, the scaled maxD=maxD× ($S_{aoi}/S_{features}$). If the bounding box is smaller than the area of interest, then maxD will be increased to accommodate the uncertainty concerning e.g. a low-texture foreground in the area of interest.

Finally, at 216, the longest distance between the remaining pairs of matched is determined and this is used as the upper bound on the disparity search. The largest pixel shift maxD required for disparity estimation of that particular captured scene is an output 218 of the determination.

Figure 3:
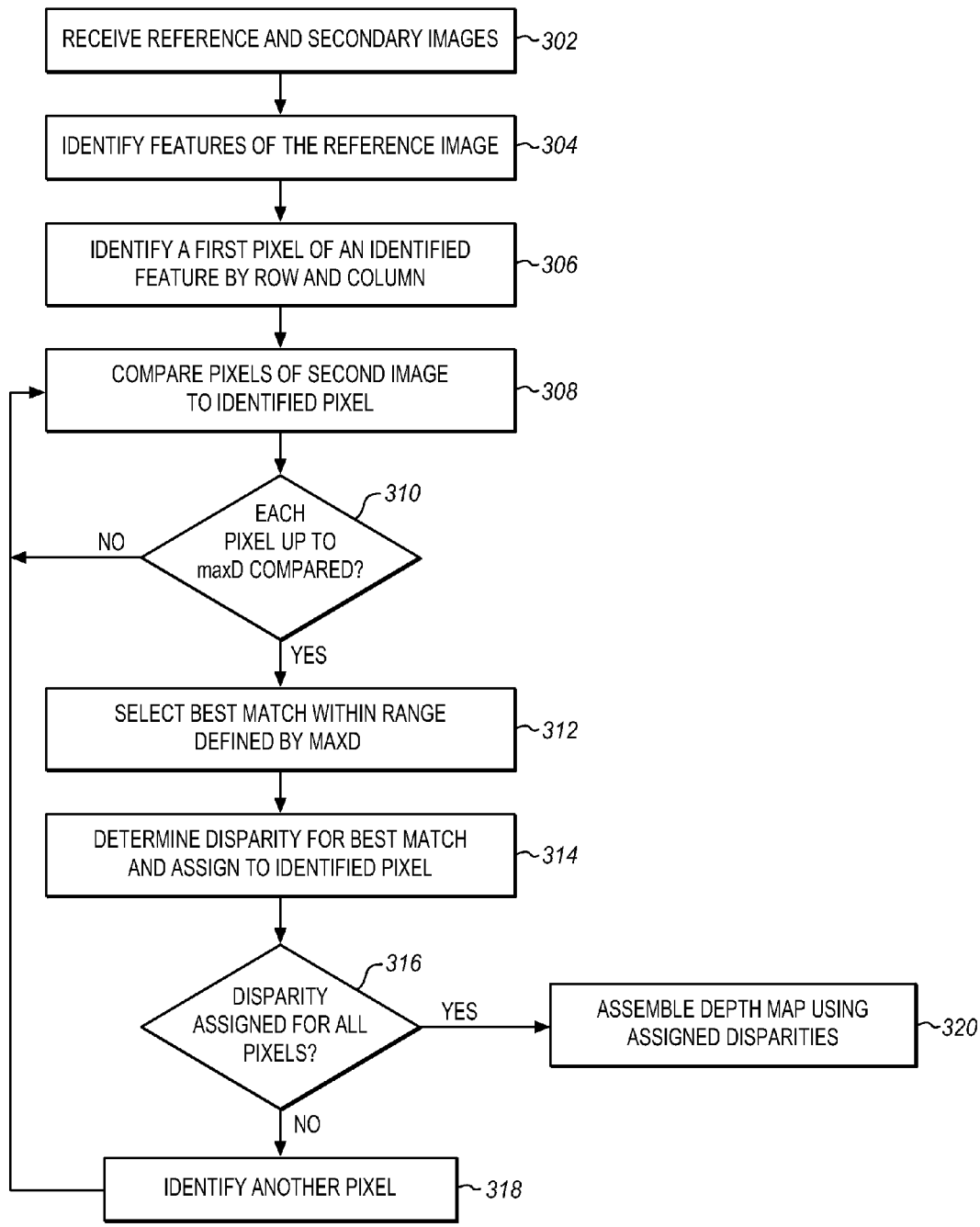
FIG. 3 is a process flow diagram of estimating disparity between aligned images according to an embodiment.

FIG. 3 is a process flow diagram of a typical disparity determination for a pair of images of a single scene. For images from two cameras viewing the same scene, there is a disparity between the pixel location of a feature in the scene in one image as compared to the pixel location of the same feature in the other image. Typically cameras are horizontally aligned so that the two pixels corresponding to the same feature point for the scene are in the same row, however, this is not necessary. In this simple case, the disparity is the difference between the row position of the pixel in the one image as compared to the other image. This value depends on how the cameras are pointed at the scene and the distance to the object in the scene corresponding to the feature.

First at 302 the two images are received. One image is identified as a reference image and the other as the secondary image. Typically it does not matter which image is selected as the reference image. At 304, features in the reference image are identified. At 306 a pixel corresponding to a feature or part of a feature of the first image is identified including its row or its vertical position in the image.

At 308, pixels in the corresponding row of the second image are compared to the identified pixel of the first image. A zero disparity occurs if the identified pixel of the first image matches the pixel in the second image that is in exactly the same row and the same position in the row, i.e. same column. In other words when the pixel at (x, y) of the first image matches the pixel at (x, y) of the second image, then the disparity is zero. Zero disparity should occur only for objects that are so distant that the cameras are not able to distinguish different distances. As objects become closer to the cameras, the disparity increases.

If the cameras are horizontally aligned, then starting with zero disparity, the next pixel is then compared. The next pixel corresponds to a disparity of one. This pixel will be on the left or the right depending on the relative positions of the cameras. The next pixel is then compared and the comparisons end at 310 when enough of the pixels have been compared. The maxD value discussed above may be used to limit the size of the search either in the horizontal direction, the vertical direction or both. If, for example, the maxD value is ten in the horizontal direction, then starting with zero disparity, all of the pixels in positions displaced from one to ten positions to the right are compared, for a total of 11 pixels. MaxD may have values in one or two dimensions.

The comparisons generate some type of difference metric from a simple difference to more complex statistical error or cost metrics, depending on the implementation. The metrics are compared for each of the candidate pixels and the best one is selected at 312. The disparity value for that pixel is then assigned to the pixel in the reference image at 314. At 316 the disparity determination is repeated for all of the pixels or for pixels of all of the features or for some other subset. After all of the intended pixels are processed at 318, a depth map or other output result may be assembled at 320. The depth map may be used for a variety of different applications.

While only a few disparity determination techniques are described herein, the invention is not so limited. The determined upper bound may be adapted for use with a wide variety of different technique.

As may be understood from FIG. 3, there may be a large number of comparisons in order to complete the entire depth map. In some cases, there are more than two images so that the system also determines disparity values between the reference image and one or more additional images. The disparity for each pairing may then be combined for more detailed or accurate results. The many comparisons mean that results are available more quickly with less processing when maxD is as small as possible. At the same time, accuracy is improved when maxD is as large as necessary.

Figure 4:
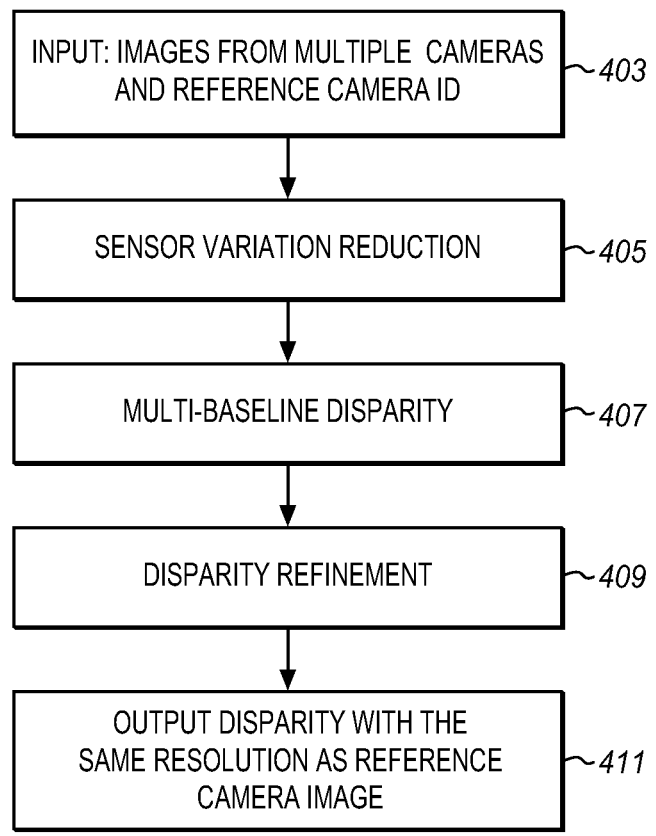
FIG. 4 is a process flow diagram of estimating disparity between nonaligned images according to an embodiment.

The maxD determination described above may also be applied to much more refined and complex disparity determinations including those for which the image sensors are not properly aligned. FIG. 4 is a process flow diagram for such a disparity estimation. This process is described with three basic groups of operations shown as a sequence of operational modules in FIG. 4. As with the example of FIG. 2, the modules may perform the described operations in hardware, in firmware, or in software, and the modules may be implemented in different processing stages or using a single processing stage. The operational modules may be integrated into a single image signal processor (ISP) or in several different processing systems. The framework receives an input image 403 from each camera and an identification of the corresponding camera. The images may be part of a sequence of images as in a video captured by all three cameras. The images are rectified and may be processed for noise, distortion, and other artifacts.

The input images are rectified in a previous operational module or in the cameras to simplify the process of determining inter-image position correspondences, by enabling searches for corresponding positions to be confined along epipolar lines. The rectification is typically done by rotationally transforming the captured images based on reference points taken from the corresponding image from the reference camera.

At the first module 405 images from multiple cameras are processed to reduce sensor variation. The system reduces the variation of images from the sensors in terms of resolution, color characteristics, noise patterns, etc. At the second module 407 a multi-baseline disparity is determined from the reference camera to each of the other cameras in the array.

The horizontal baseline, $b0\_x$, $b1\_x$, may be described as the distance between the horizontal location of the reference camera Cr and the horizontal location of other cameras C0, C1. Similarly the vertical baseline, $b0\_y$, $b1\_y$, may be described as the distance between the vertical location of the reference image Cr and the vertical location of the other cameras C0, C1. The multi-baseline disparity calculation takes both the horizontal and the vertical into consideration.

The system matches the reference camera image with the other images. The cameras from the other image may be located in any distance and any direction whether horizontal, vertical, or diagonal. At the third module 409 the disparity output is refined to get cleaner and smoother disparity results. The system increases the robustness of the image match to improve the quality of an image disparity result. The output 411 of this framework is an image disparity that may be passed to other modules for use in other operations. This output may have the same resolution as the reference camera even if the secondary camera has a different resolution.

As described below, the camera array may have any spatial layout. Any camera may be used as the reference camera. The disparity is calculated based on comparing the reference camera to each of the other cameras individually and aggregating them using the multi-baseline mechanism. There is one set of disparity values for each secondary camera image. The choice of reference camera is not important. Any camera may serve as the reference camera. The other cameras need not be located on a horizontal and vertical baseline with respect to the reference camera.

Figure 5:
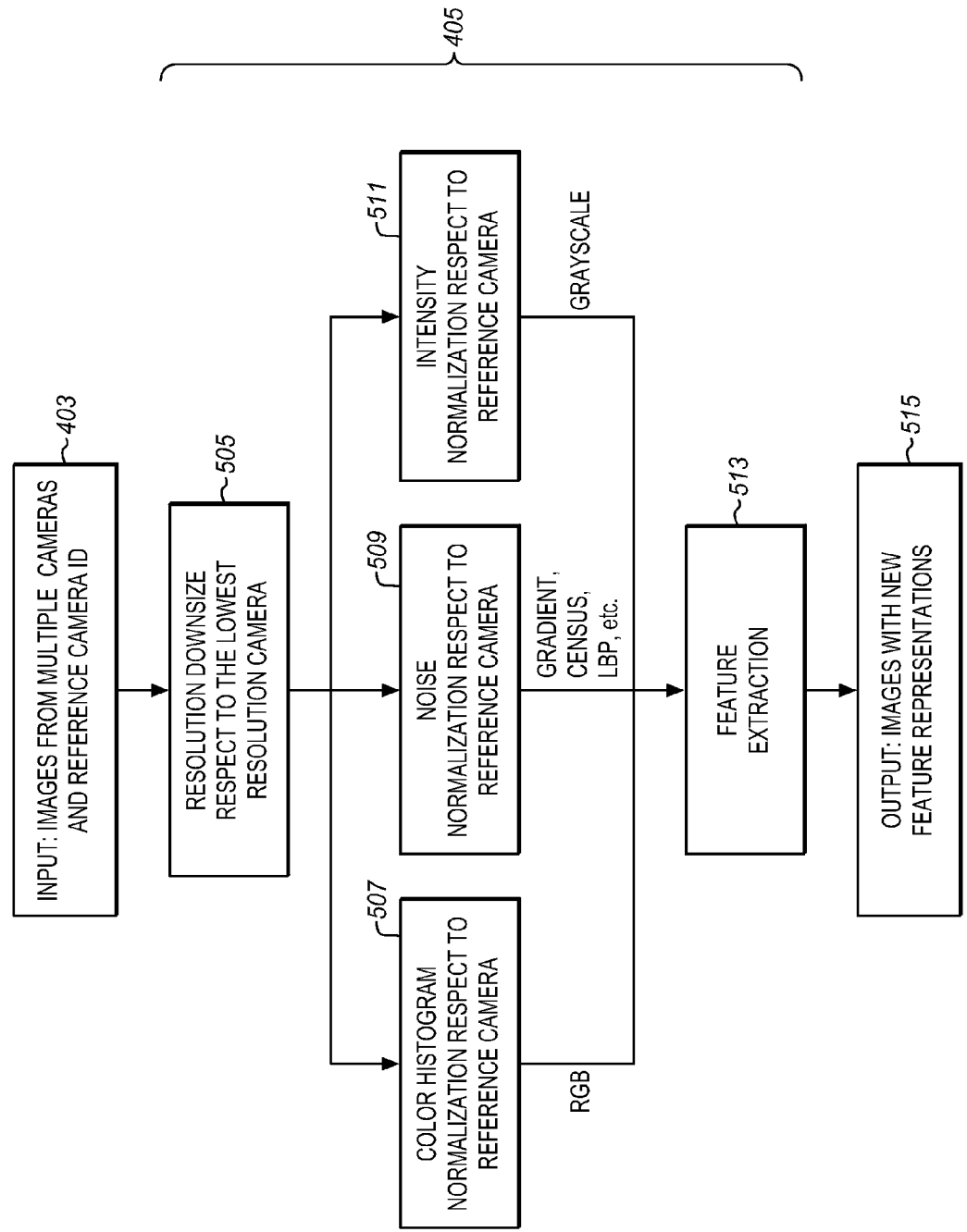
FIG. 5 is a process flow diagram of reducing sensor variations according to an embodiment.

FIG. 5 is an expanded view of the operations performed by sensor variation reduction module 405 of FIG. 4. The sensor variation reduction may include the four stages as shown or there may be more or fewer stages, depending on the implementation.

A hybrid camera array poses technical difficulties in matching images from different types of sensors (different resolutions, color characteristics, noise patterns, etc.). This can be simplified by first determining the lowest resolution of all the images and then downsizing 505 the other images to the resolution of the lowest resolution camera. By doing that, all images have the same resolution and a pixel-to-pixel correspondence search can efficiently be performed in a disparity calculation module. The images may then be transformed to a new features representation.

Since the color characteristics, noise patterns, etc. may be very different for different cameras or different image sensors, the disparity determinations are improved by reducing variances caused by other aspects of the camera. The variance may be reduced based on the features that are going to be extracted to represent the images. FIG. 3 presents three alternative normalization operations 507, 509, 511, that may be performed to reduce the variances in the images. Other variance reduction operations may be performed instead or in addition, depending on how the disparity is to be determined. Alternatively, several different disparity estimations may be performed so that one or more different variance reduction operations are performed for each estimate. As an example, one path may use noise normalization and a separate parallel path (not shown) may use intensity normalization.

In the first example, if RGB (Red Green Blue) color is used to represent features, then a color histogram normalization module 507 may be used to match images to the same color characteristics as the reference camera. If grayscale is used to represent features, then an intensity histogram normalization module 511 may be used to match images to the same intensity characteristics as the reference camera. Features such as gradient, census, and LBP (Local Binary Pattern) are less sensitive to color variations, but sensitive to noise. If these features are used then a noise normalization module 509 may be used to match images to the same noise characteristics as the reference camera.

After the variations are reduced, then a feature extraction module 513 is applied to the resulting downscaled, normalized images. The result is a set of images with representations of the feature that will be used for estimating the disparities 515.

Figure 6:
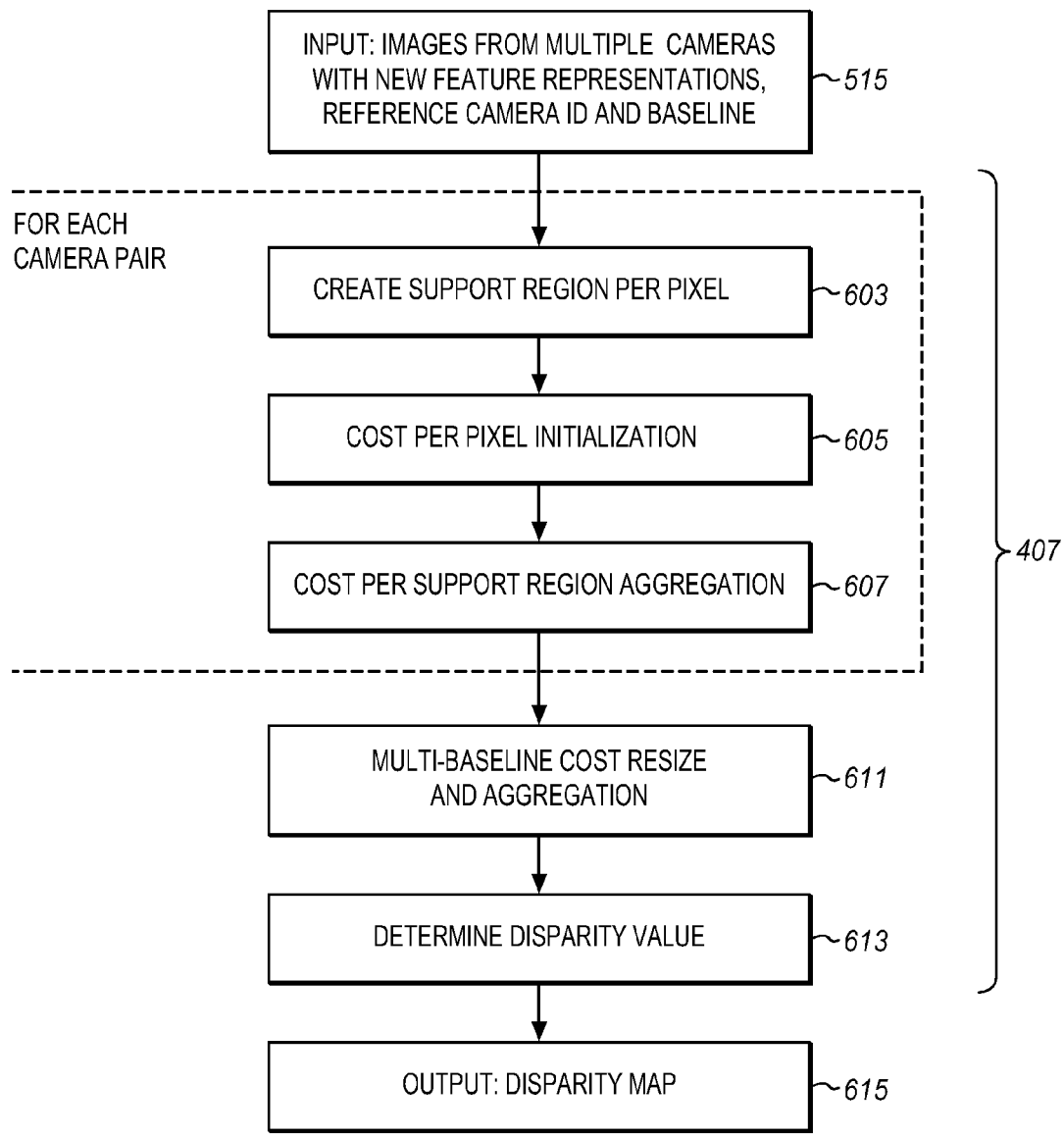
FIG. 6 is a process flow diagram of estimating the disparity for multiple images according to an embodiment.

Once features are extracted, a multi-baseline disparity process 407 may be performed as shown in the process flow diagram of FIG. 6. FIG. 6 is an expanded view of operations performed by the multi-baseline disparity module. The input from the sensor variation reduction 405 is images from multiple cameras with new feature representations, the reference camera ID and the baseline.

The disparity calculations are performed on image pairs. The image from each secondary camera is compared to the corresponding processed image from the reference camera. At 603, a support region is created on a per-pixel basis. An adaptive shape support region may be used for accurate disparity estimates. At 605, a cost per pixel is initialized. For each pair of camera images Cr and Ci, a pixel-wise absolute difference is taken using features at each candidate disparity d. At 607, the cost per support region is aggregated, i.e. for each pair of cameras Cr and Ci, the absolute difference errors are aggregated.

After finishing all the pairwise processes, at 611 all the pairwise SAD (Sum of Absolute Differences) error costs are resized with respect to the SAD with the longest baseline and then aggregated. This allows a multi-baseline disparity value to be determined at 613 for a given pixel (x, y) in the reference camera along the longest baseline. The result is then a disparity map which provides a value for each pixel.

Considered in more detail, the shape support regions are adaptive. An adaptive shape will provide higher accuracy for the disparity estimates than a fixed size region or fixed window shape. The adaptive shape is determined so that the pixels used for a sum of absolute differences (SAD) calculation all have the same depth. A fixed window size can produce inaccuracies at low texture neighborhoods and at depth discontinuity areas.

To find 603 the adaptive shape support region, each pixel (x, y) is extended in four directions (left, right, up and down) until it hits a pixel for which the value for the selected feature, e.g. color, gradient or grayscale, exceeds a threshold difference. In other words, the feature value for the selected pixel is compared to the feature value for each pixel in each direction until the difference exceeds a threshold. This walk through the image features for the pixels can be also be described as follows: for each pair of images from two different cameras (Cr, the reference camera, and Ci, the secondary camera), and for each candidate disparity $d=(d_x, d_y)$, where $d_x$ and $d_y$ are the candidate disparity in the horizontal and vertical directions, respectively, that is calculated using the baseline ratio $d_x=d*bi\_x/bi$ and $d_y=d*bi\_y/bi$, where bi is the baseline distance from the reference camera and the ith camera and bi_x, bi_y are the horizontal and vertical baseline distances from the reference camera to the $i^{th}$ camera, respectively, a support region is constructed for each pixel (x, y) in Cr and corresponding comparing pixel $(x+d_x, y+d_y)$ in Ci. The candidate disparities $d_x$, $d_y$ are limited by a value for maxD in both the horizontal and vertical directions. $maxD_x=maxD*bi\_x/bi$, $maxD_y=maxD*bi\_y/bi$ Finally, the support region S of pixel (x, y) in Cr at disparity d is the overlapped region of all (Cr, Ci) pairs. The process is repeated to construct support regions for all of the pixels of the reference camera image.

The cost function 605 is determined for each pair of images from the respective primary Cr and secondary camera Ci. A pixel-wise absolute difference (AD) is initialized using features at each candidate disparity d. Equation 1 is a relation for determining an AD for each pixel (x,y) as a function of the disparity $$AD_i(d)=|I_r(x,y)-I_i(x+d_x,y+d_y)| \quad \text{Eq. 1}$$

where $I_r$ and $I_i$ refer to image features of Cr and Ci, respectively.

The aggregation function 607 is performed for each respective image pair from the primary Cr and secondary Ci camera. The AD errors are aggregated using a sum of absolute differences (SAD) over all pixels in each support region S of pixel (x y) of reference camera at disparity d. Integral image techniques may be used to improve the efficiency of the calculation. This is shown in Equation 2.

$$SAD_i(d)=\Sigma|I_r(x+k,y+t)-I_i(x+k+d_x,y+t+d_y)| \quad \text{Eq. 2}$$

where the sum over all $(k,t)\in S_{i,r}(d)$, where $S_{i,r}(d)$ is the support region of pixel (x,y).

The resize and aggregate function 611 is used to resize all the pairwise SAD error costs between images of each pair to the longest baseline based on a baseline ratio using bilinear interpolation. The error costs are then aggregated together using an aggregate function. The aggregate function may be for example a $SAD_i(d)$ with the minimum error or an average of a subset of $\{SAD_i(d)\}$ with the minimum error. The resizing and aggregation is represented in Equation 3.

$$E(d)=\text{aggregate}(SAD_i^{resized}(d)) \quad \text{Eq. 3}$$

where E(d) is the aggregate error.

Finally, the multi-baseline disparity value for a given pixel (x, y) in the reference camera along the longest baseline is calculated by finding the minimum d in the summarized error map from all camera pairs $$d(x,y)=\text{argmin}_d E(d) \quad \text{Eq. 4}$$

The disparity from Eq. 1 might still contain noise. In order to get a cleaner and smoother disparity output, a refinement step may be used to remove noise and low confident disparity values. In the described framework, methods such as the uniqueness of global minimum cost, variance of the cost curve, etc. have been used. Using these determinations, median filter, joint bilateral filter, etc., have already been calculated and may easily be used to fill holes that were removed in the previous disparity calculation operations. In addition, if the disparity map's resolution is lower than the original resolution of the reference camera image, the disparity map may be upscaled to the same resolution as that of the reference camera.

Figure 7:
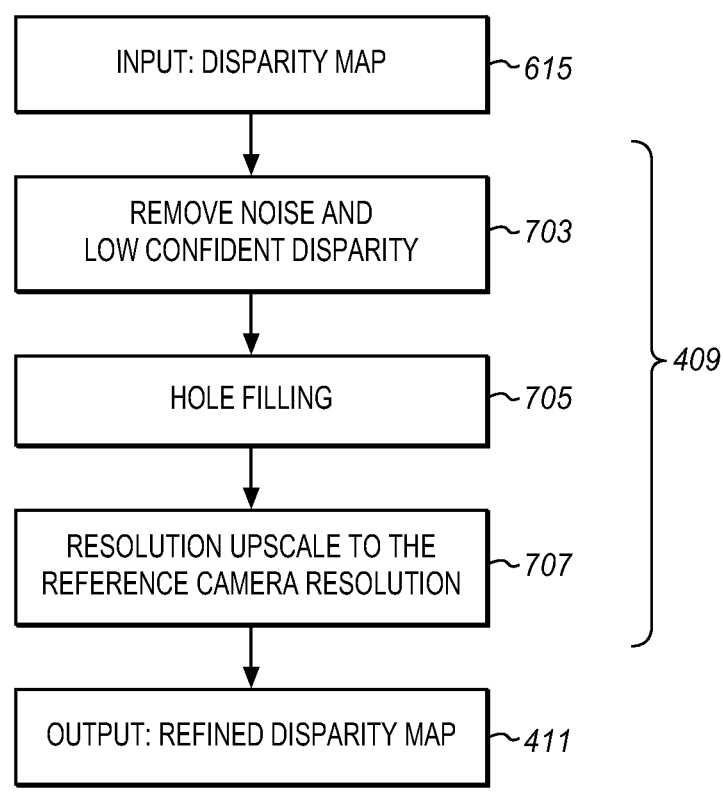
FIG. 7 is a process flow diagram of refining the disparity for the multiple images according to an embodiment.

FIG. 7 is an expanded view of operations performed by the disparity refinement module 409. The disparity map 615 is provided as an input. The refinement operations include removing noise and low confidence disparities 703. Next, holes in the images are filled 705 using neighboring or mean values. Finally the resolution is upscaled 707, if necessary to produce a refined disparity map output 411.

This technique may be used for software (especially for developing graphics and media applications) that uses array cameras. This technique may be used for hardware in consumer electronics, PC, mobile and handheld devices that use array cameras. Service providers (such as media service providers) that use camera arrays may also use this technique.

Incorporating hybrid camera array technology into a platform can enable many applications with compelling user experiences, including 3D media capture, HDR (High Dynamic Range), viewing, interaction, high-speed video, etc. on mobile, ultra-mobile, desktop and TV (Television) platforms.

A complete framework and process of calculating disparity from a hybrid array of cameras with arbitrary spatial layouts is described. This approach may be incorporated as part of a platform design. It could also be incorporated as a component into a graphics or media kit or into middleware products.

Figure 8:
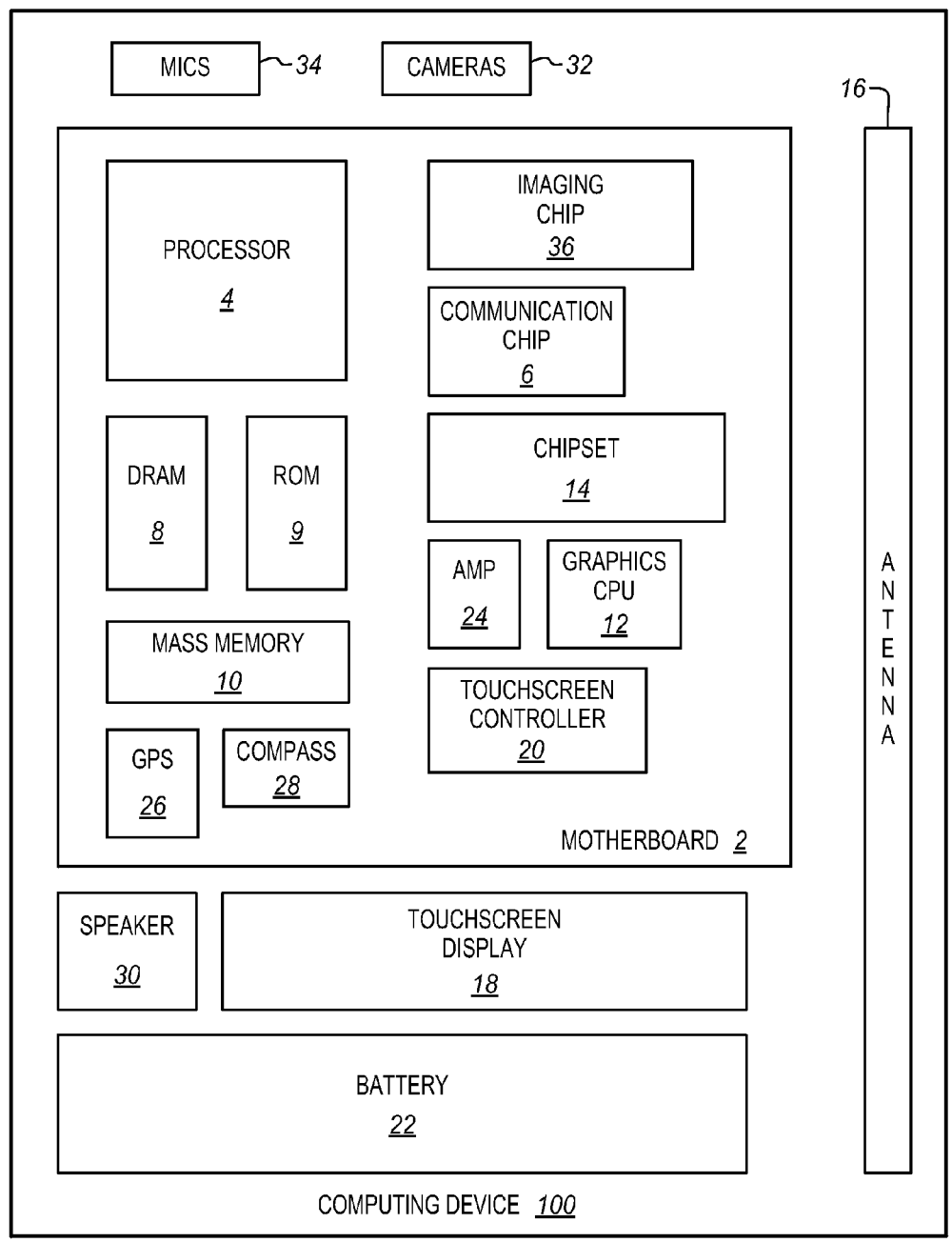
FIG. 8 is a block diagram of a computing device incorporating an image processing system with multiple cameras according to an embodiment.

FIG. 8 illustrates a computing device 100 in accordance with one implementation. The computing device 100 houses a system board 2. The board 2 may include a number of components, including but not limited to a processor 4 and at least one communication package 6. The communication package is coupled to one or more antennas 16. The processor 4 is physically and electrically coupled to the board 2.

Depending on its applications, computing device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, a camera array 32, a microphone array 34, and a mass storage device (such as hard disk drive) 10, compact disk (CD) (not shown), digital versatile disk (DVD) (not shown), and so forth). These components may be connected to the system board 2, mounted to the system board, or combined with any of the other components.

The camera array may be coupled to an image chip 36 and to the processor 4, either directly or through the image chip. The image chip may take a variety of different forms, such as a graphics co-processor, a digital signal processor (DSP), an image signal processor (ISP), or any other type of separate dedicated imaging management module. Such a device or module may comprise logic, algorithms, and/or instructions operative to capture, process, edit, compress, store, print, and/or display one or more images. In some embodiments, the imaging management module may comprise programming routines, functions, and/or processes implemented as software within an imaging application or operating system. In various other embodiments, the image processing may be implemented as a standalone chip or integrated circuit, or as circuitry comprised within the processor, within a graphics chip or other integrated circuit or chip, or within a camera module. The techniques described above may be implemented in the image chip of the processor or functions may be distributed between different components which may include the cameras, image chip, processor, and other components.

The communication package 6 enables wireless and/or wired communications for the transfer of data to and from the computing device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 100 may include a plurality of communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

In various implementations, the computing device 100 may be a laptop, a netbook, a notebook, an ultrabook, a smartphone, a wearable device, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. The computing device may be fixed, portable, or wearable. In further implementations, the computing device 100 may be any other electronic device that processes data.

Embodiments may be implemented as a part of one or more memory chips, controllers, CPUs (Central Processing Unit), microchips or integrated circuits interconnected using a motherboard, an application specific integrated circuit (ASIC), and/or a field programmable gate array (FPGA).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. The various features of the different embodiments may be variously combined with some features included and others excluded to suit a variety of different applications. Some embodiments pertain to a method that includes receiving a reference image and a second image of a scene from multiple cameras of a camera array, detecting feature points of the reference image, matching points of the detected features to points of the second image, determining a maximum disparity between the reference image and the second image, and determining disparities between the reference image and the second image by comparing points of the reference image to points of the second image wherein the points of the second image are limited to points within the maximum disparity.

In further embodiment the points correspond to individual pixels.

In further embodiment the points correspond to features of the reference image.

In further embodiment detecting features comprises performing a sparse keypoint detection.

In further embodiment matching points comprises extracting feature descriptors and matching feature points of the detected features using the extracted descriptors.

In further embodiment determining a maximum disparity comprises comparing the disparity for each of the matched points and selecting the largest disparity as the maximum disparity.

Further embodiments include removing unreliable matches before determining a maximum disparity.

In further embodiment removing unreliable matches comprises removing matches that do not conform to an epipolar geometry between the reference image and the second image.

In further embodiment removing unreliable matches includes for each point of a matched pair of feature points determining a distance between the two points, creating a histogram of the determined distances, the histogram comprising a plurality of bins, each corresponding to a range of distances, comparing the number of matched pair in each bin to a threshold number of pairs, and removing the pairs in each bin that does not have at least the threshold number of pairs.

Further embodiments include scaling the determined maximum disparity using a scaling factor determined using an area of interest of the reference image.

In further embodiment the scaling factor comprises a comparison of an area of interest to bounding box of the detected features within the area of interest.

In further embodiment determining disparities comprises a pair-wise pixel-to-pixel correspondence search of the second image to a pixel in the reference image, wherein the search is limited to pixels of the second image within the maximum disparity Some embodiments pertain to a non-transitory machine-readable medium having instructions thereon that when executed by the machine cause the machine to perform operations that include receiving a reference image and a second image of a scene from multiple cameras of a camera array, detecting feature points of the reference image, matching points of the detected features to points of the second image, determining a maximum disparity between the reference image and the second image, and determining disparities between the reference image and the second image by comparing points of the reference image to points of the second image wherein the points of the second image are limited to points within the maximum disparity.

In further embodiment matching points comprises matching pixels corresponding to the detected feature points.

In further embodiment detecting features comprises performing a sparse keypoint detection.

Further embodiments include removing unreliable matches before determining a maximum disparity and wherein determining a maximum disparity comprises comparing the disparity for each of the matched points except for the removed matches and selecting the largest disparity as the maximum disparity.

Further embodiments include removing unreliable matches before determining a maximum disparity by removing matches that do not conform to an epipolar geometry between the reference image and the second image.

Further embodiments include removing unreliable matches before determining a maximum disparity by for each point of a matched pair of feature points determining a Euclidean distance between the two points, determining a set of distance ranges and removing pairs for which there are less than a threshold number of pairs within a distance range of the set of distance ranges.

Some embodiments pertain to portable device that includes a surface of the device, a plurality of cameras on the surface, each camera having an image sensor to produce an image, the multiple cameras including a reference camera and at least one secondary camera, and an image signal processor to receive a reference image of a scene from the reference camera and a second image of the scene from the secondary camera, to detect feature points of the reference image, to match points of the detected features to points of the second image, to determine a maximum disparity between the reference image and the second image, and to determine disparities between the reference image and the second image by comparing points of the reference image to points of the second image wherein the points of the second image are limited to points within the maximum disparity.

In further embodiment determining a maximum disparity comprises comparing the disparity for each of the matched points and selecting the largest disparity as the maximum disparity.

In further embodiment determining disparities comprises a pair-wise pixel-to-pixel correspondence search of the second image to a pixel in the reference image, wherein the search is limited to pixels of the second image within the maximum disparity.

What is claimed is:

1. A method comprising:
   receiving a reference image and a second image of a scene from multiple cameras of a camera array;
   detecting feature points of the reference image;
   matching points of the detected features to points of the second image;
   determining as maximum disparity between the reference image and the second image using the matching of points;
   scaling the determined maximum disparity by a factor of a size of an area of interest compared to a size of a bounding box that contains the detected feature points; and
   after determining a maximum disparity, using the scaled determined maximum disparity by determining disparities between the reference image and the second image by comparing points of the reference image to points of the second image wherein the points of the second image are limited to points within the maximum disparity.

2. The method of claim 1, wherein the points correspond to individual pixels.

3. The method of claim 1, wherein the points correspond to features of the reference image.

4. The method of claim 1, wherein detecting features comprises performing a sparse keypoint detection.

5. The method of claim 1, wherein matching points comprises extracting feature descriptors and matching feature points of the detected features using the extracted descriptors.

6. The method of claim 1, wherein determining a maximum disparity comprises comparing the disparity for each of the matched points and selecting the largest disparity the maximum disparity.

7. The method of claim 1, further comprising removing matches before determining a maximum disparity.

8. The method of claim 7, wherein removing unreliable matches comprises removing matches that do not conform to an epipolar geometry between the reference image and the second image.

9. The method of claim 7, wherein removing unreliable matches comprises:
   for each point of a matched pair of feature points determining a distance between the two points;
   creating a histogram of the determined distances, the histogram comprising a plurality of bins, each corresponding to a range of distances;
   comparing the number of matched pair in each bin to a threshold number of pairs; and
   removing the pairs in each bin that does not have at least the threshold number of pairs.

10. The method of claim 1, wherein determining disparities comprises a pair-wise pixel-to-pixel correspondence search of the second image to a pixel in the reference image, wherein the search is limited to pixels of the second image within the maximum disparity.

11. A non-transitory machine-readable medium having instructions thereon that when executed by the machine cause the machine to perform operations comprising:
receiving a reference image and a second image of a scene from multiple cameras of a camera array;
detecting feature points of the reference image;
matching points of the detected features to points of the second image;
determining a maximum disparity between the reference image and the second image using the matching of points;
scaling the determined maximum disparity by a factor of a size of an area of interest compared to a size of a bounding box that contains the detected feature points; and
after determining a maximum disparity, using the scaled determined maximum disparity by determining disparities between the reference image and the second image by comparing points of the reference image to points of the second image wherein the points of the second image are limited to points within the maximum disparity.

12. The medium of claim 11, wherein matching points comprises matching pixels corresponding to the detected feature points.

13. The medium of claim 11, wherein detecting features comprises performing a sparse keypoint detection.

14. The medium of claim 11, further comprising determining that a match is unreliable as not conforming to a geometry constraint, removing unreliable matches before determining a maximum disparity and wherein determining a maximum disparity comprises comparing the disparity for each of the matched points except for the removed matches and selecting the largest disparity as the maximum disparity.

15. The medium of claim 11, further comprising removing unreliable matches before determining a maximum disparity by removing matches that do not conform to an epipolar geometry between the reference image and the second image.

16. The medium of claim 11, further comprising removing matches before determining a maximum disparity by for each point of a matched pair of feature points determining a Euclidean distance between the two points, determining a set of distance ranges and removing pairs for which there are less than a threshold number of pairs within a distance range of the set of distance ranges.

17. A portable device comprising;
a surface of the device;
a plurality of cameras on the surface, each camera having an image sensor to produce an image, the multiple cameras including a reference camera and at least one secondary camera; and
an image signal processor to receive a reference image of a scene from the reference camera and a second image of the scene from the secondary camera, to detect feature points of the reference image, to match points of the detected features to points of the second image, to determine a maximum disparity between the reference image and the second image using the matching points, to scale the determined maximum disparity by a factor of a size of an area of interest compared to a size of a bounding box that contains the detected feature points, and after determining a maximum disparity, using the scaled determined maximum disparity to determine disparities between the reference image and the second image by comparing points of the reference image to points of the second image wherein the points of the second image are limited to points within the maximum disparity.

18. The device of claim 17, wherein determining a maximum disparity comprises comparing the disparity for each of the matched points and selecting the largest disparity as the maximum disparity.

19. The device of claim 17, wherein determining disparities comprises a pair-wise pixel-to-pixel correspondence search of the second image to a pixel in the reference image, wherein the search is limited to pixels of the second image within the maximum disparity.

20. The method of claim 1, wherein the factor increases the determined maximum disparity if the bounding box is smaller than the area of interest.

21. The method of claim 1, wherein the area of interest is a ¾ area of the reference image.

* * * * *